United States Patent
Ducrohet

(10) Patent No.: US 10,504,078 B2
(45) Date of Patent: Dec. 10, 2019

(54) METHOD FOR PROCESSING TRANSACTIONAL DATA, TERMINAL, SERVER AND CORRESPONDING COMPUTER PROGRAMS

(71) Applicant: Ingenico Group, Paris (FR)

(72) Inventor: Vincent Ducrohet, Saint Cyr L'Ecole (FR)

(73) Assignee: INGENICO GROUP, Paris (FR)

( * ) Notice: Subject to any disclaimer, the term of this patent is extended or adjusted under 35 U.S.C. 154(b) by 319 days.

(21) Appl. No.: 15/024,271

(22) PCT Filed: Sep. 26, 2014

(86) PCT No.: PCT/EP2014/070704
§ 371 (c)(1),
(2) Date: Mar. 24, 2016

(87) PCT Pub. No.: WO2015/044393
PCT Pub. Date: Apr. 2, 2015

(65) Prior Publication Data
US 2016/0239816 A1    Aug. 18, 2016

(30) Foreign Application Priority Data

Sep. 27, 2013  (FR) .................... 13 59350

(51) Int. Cl.
*G06Q 40/00*  (2012.01)
*G06Q 20/14*  (2012.01)
(Continued)

(52) U.S. Cl.
CPC ....... *G06Q 20/14* (2013.01); *G06K 19/06037* (2013.01); *G06Q 20/102* (2013.01);
(Continued)

(58) Field of Classification Search
CPC ..................................................... G06Q 20/14
(Continued)

(56) References Cited

U.S. PATENT DOCUMENTS 7,457,767 B1    11/2008  Dunsmore et al.
2002/0077976 A1* 6/2002  Meyer ................. G06O 20/04
                                              705/40
(Continued)

FOREIGN PATENT DOCUMENTS

| CN | 102164202 A | 8/2011 |
| DE | 4326756 C1 | 9/1994 |
| WO | 2011094424 A1 | 8/2011 |

OTHER PUBLICATIONS

English translation of the International Written Opinion dated Nov. 28, 2014 for International Application No. PCT/EP2014/070704, filed Sep. 26, 2014.

(Continued)

*Primary Examiner* — Samica L Norman
(74) *Attorney, Agent, or Firm* — David D. Brush; Westman, Champlin & Koehler, P.A.

(57) ABSTRACT

A method for processing transactional data, via a payment terminal. The method includes capturing at least one datum representing a bill to be paid, called a consolidated datum, from a pre-existing support; formatting the consolidated datum by a collection application of the payment terminal, delivering a digital invoice; displaying the digital invoice by the collection application; transmitting to a payment application of the payment terminal at least one datum, called a transactional datum, representing an amount to be paid according to at least one element of the digital bill.

8 Claims, 3 Drawing Sheets

Figure 1:
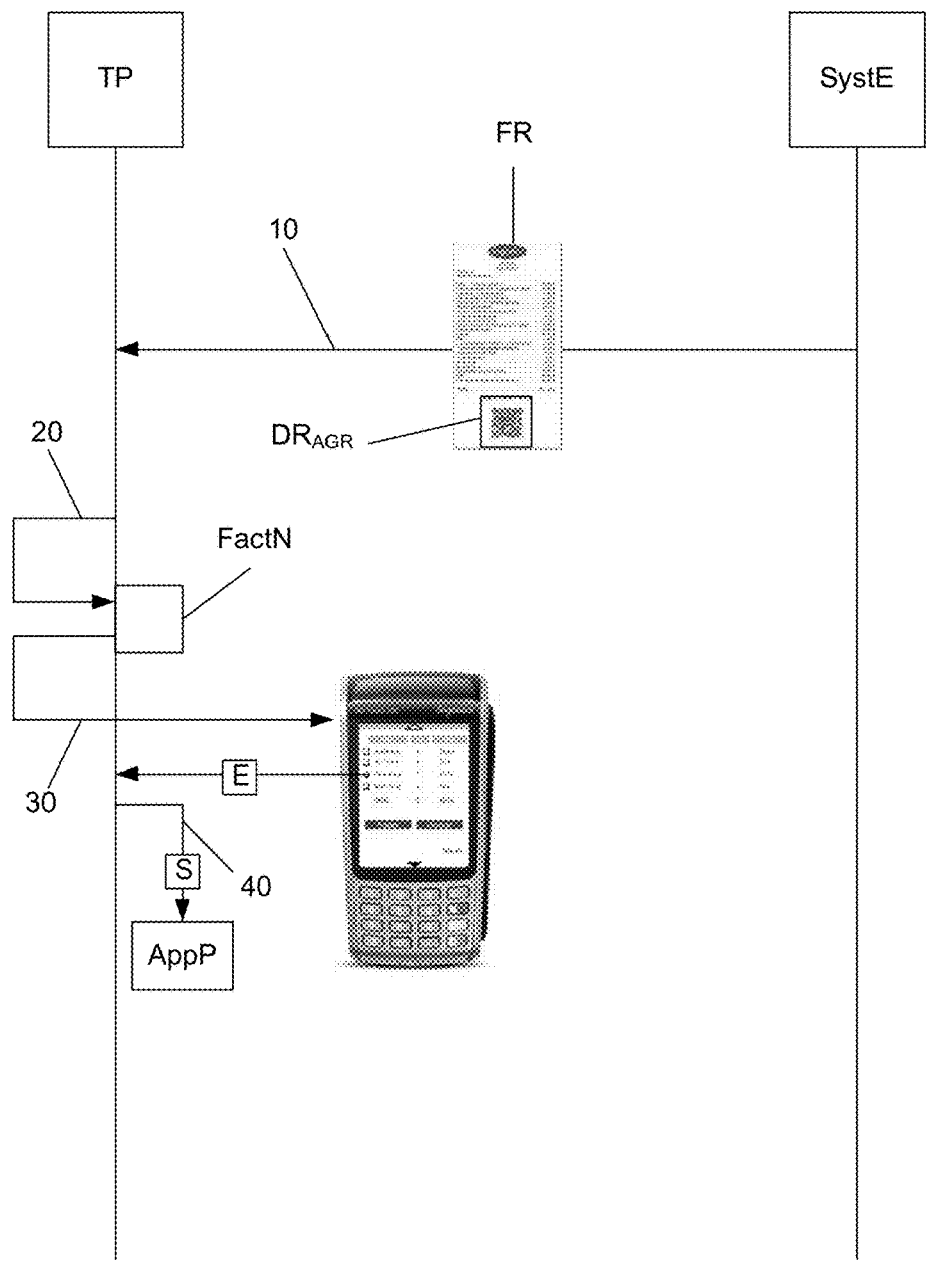

(51) Int. Cl.
| | |
|---|---|
| *G06Q 20/20* | (2012.01) |
| *G06K 19/06* | (2006.01) |
| *G06Q 30/04* | (2012.01) |
| *G06Q 20/32* | (2012.01) |
| *G06Q 20/10* | (2012.01) |
| *G07F 7/08* | (2006.01) |

(52) U.S. Cl.
CPC ............ *G06Q 20/20* (2013.01); *G06Q 20/32* (2013.01); *G06Q 20/322* (2013.01); *G06Q 20/3276* (2013.01); *G06Q 30/04* (2013.01); *G07F 7/0873* (2013.01); *G07F 7/0886* (2013.01)

(58) Field of Classification Search
USPC .................. 705/40, 14.23, 26.7; 235/383
See application file for complete search history.

(56) References Cited

U.S. PATENT DOCUMENTS

| | | |
|---|---|---|
| 2007/0215695 A1 | 9/2007 | Trane |
| 2009/0108080 A1 | 4/2009 | Meyer et al. |
| 2013/0018715 A1* | 1/2013 | Zhou .................. G06Q 20/3274 705/14.23 |
| 2013/0146659 A1* | 6/2013 | Zhou .................... G06Q 20/355 235/380 |
| 2013/0334308 A1* | 12/2013 | Priebatsch ............. G06Q 90/00 235/383 |
| 2014/0006205 A1* | 1/2014 | Berry ................. G06O 30/0641 705/26.7 |

OTHER PUBLICATIONS

International Search Report and Written Opinion dated Nov. 28, 2014 for International Application No. PCT/EP2014/070704, filed Sep. 26, 2014.

French Search Report and Written Opinion dated Jul. 31, 2014 for French Application No. 1359350, filed Sep. 27, 2013.

Machine translation of the European Office Action dated Apr. 16, 2019 for corresponding European Application No. 14777571.2.

* cited by examiner

METHOD FOR PROCESSING TRANSACTIONAL DATA, TERMINAL, SERVER AND CORRESPONDING COMPUTER PROGRAMS

CROSS-REFERENCE TO RELATED APPLICATIONS

This Application is a Section 371 National Stage Application of International Application No. PCT/EP2014/070704, filed Sep. 26, 2014, the content of which is incorporated herein by reference in its entirety, and published as WO 2015/044393 on Apr. 2, 2015, not in English.

FIELD OF THE INVENTION

The invention pertains to the field of payment devices. More particularly, the invention pertains to a payment device that has capacities for collecting payment on invoices or cashing invoices.

PRIOR ART

Payment terminals are now mainly used in businesses to settle purchases. Merchants are accepting these payment terminals because they offer a degree of transactional security greater than that of other payment means (such as checks) and avert the inconvenience of having large quantities of cash at hand.

Thus, the payment terminal has become the merchant's preferred accessory. However, in certain situations, the payment terminal is not yet suited to the merchant's needs because of a lack of functions related to specific trades. For example, in order to facilitate payment-collection or cashing operations, merchants need an invoice-cashing solution that is integrated into the payment terminal. The term "cashing solution" is understood to mean firstly integration and communication between the payment terminal and a smart cash register and secondly compliance with prevailing standards on payment (such standards are generally custom-built for a given country).

Thus, integration between a payment terminal and a cash register depends on the cashing system (for example the cash register) of the payment terminal and is generally valid only in one country. Thus, if a type of payment terminal has to be interfaced with a type of cashing system, then this must be done country by country or region by region, and this entails problems of cost.

In addition, interfacing a cashing system and a payment terminal requires competence in software development for both the cashing system and the payment terminal. This therefore calls for a complex management configuration because it is necessary to maintain numerous different versions of the software. This is therefore equally lengthy and costly.

There is therefore a need to provide a solution to problems of costs and feasibility of integration in order to provide the payment terminal with payment collection or "cashing" functions to facilitate daily life for merchants.

SUMMARY OF THE INVENTION

The proposed technique does not have these drawbacks of the prior art. More particularly, the proposed technique pertains to a method for processing transactional data by means of a payment terminal.

The proposed method is distinguished by the fact that it comprises:
- a step for capturing at least one piece of data representing an invoice to be settled, called a piece of consolidated data, from a pre-existing carrier;
- a step for formatting the consolidated data by a cashing application of said payment terminal, delivering a digital invoice;
- a step for displaying said digital invoice by said cashing application;
- at least one step for transmitting at least one piece of data to a payment application of said payment terminal, this piece of data representing a sum to be paid as a function of at least one element of said digital invoice and being called a piece of transactional data.

Thus, the proposed technique uses data on the invoice without any need to modify the operation of the cashing system (which may be a cash register). Indeed, making a capture from an existing carrier (such as a sales receipt or a printed invoice as well as a screen of the cashing system) it is not necessary to plan for a specific development on the cashing system side.

According to one particular embodiment, said step for capturing said piece of consolidated data comprises:
- at least one step for obtaining a two-dimensional code preliminarily printed on an invoice;
- a step for decoding said two-dimensional code delivering said piece of consolidated data.

Thus, obtaining a two-dimensional code alone, and then decoding the piece of data, makes it possible to transmit the data needed for the cashing application of the terminal.

According to one particular embodiment, said step for capturing said piece of consolidated data furthermore comprises, subsequently to said step for decoding said two-dimensional code, a step for decompressing the data of said two-dimensional code.

Thus, since the pieces of data are compressed on the two-dimensional code, it is possible to transmit more data on the code than can be normally transmitted by means of this type of code.

According to one particular characteristic, said step for capturing said piece of consolidated data furthermore comprises, subsequently to said step for decoding said two-dimensional code, a step for decrypting the data of said two-dimensional code.

Thus, the consolidated data cannot be decrypted by any barcode capturing application whatsoever. Nor is it possible, for an indiscreet customer to carry out fraud by modifying the content of the barcode.

According to one particular embodiment, said method furthermore comprises the following steps subsequently to the transmission of said at least one piece of data, representing a sum to be paid, to said payment application of said payment terminal:
- a step for taking control of said payment terminal by said payment application;
- a step for implementing a payment transaction by said payment application;
- a step for supplying a result of said payment transaction to said cashing application;
- a step of integration, by means of said cashing application, of said result of said payment transaction.

Thus, there is no longer any security gap in the processing of this transactional data.

In another embodiment, the proposed technique can also take the form of a payment terminal comprising processing means for processing the transactional data. These means for processing transactional data comprise:

- means for capturing at least one piece of data representing an invoice to be settled, called a piece of consolidated data;
- means for formatting the consolidated data, by means of a cashing application of said payment terminal, delivering a digital invoice;
- means for displaying said digital invoice by means of said cashing application;
- means for transmitting at least one piece of data representing a sum to be paid as a function of at least one element of said digital invoice, called a piece of transactional data, to a payment application of said payment terminal.

According to a preferred embodiment, said different steps of the methods according to the invention are implemented by one or more software programs or computer programs comprising software instructions to be executed by a data processor of a relay module according to the invention and being designed to control the execution of the different steps by the methods.

The invention is therefore also aimed at providing a program that can be executed by a computer or by a data processor, this program comprising instructions to command the execution of the steps of a method as mentioned here above.

This program can use any programming language whatsoever and can be in the form of a source code, object code or a code that is intermediate between source code and object code, such as in a partially compiled form or in any other desirable form.

The invention also aims to provide an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by a radio or by other means. The program according to the invention can be especially uploaded to an Internet type network.

As an alternative, the information carrier can be an integrated circuit into which the program is incorporated, the circuit being adapted to executing or to being used in the execution of the method in question.

According to one embodiment, the invention is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here above for the module concerned. Such a software component is executed by a data processor of a physical entity (terminal, server, gateway, router, etc) and is capable of accessing hardware resources of this physical entity (memories, recording media, communications buses, input/output electronic boards, user interfaces, etc.

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

The different embodiments mentioned here above can be combined with each other to implement the proposed technique.

LIST OF FIGURES

Figure 2:
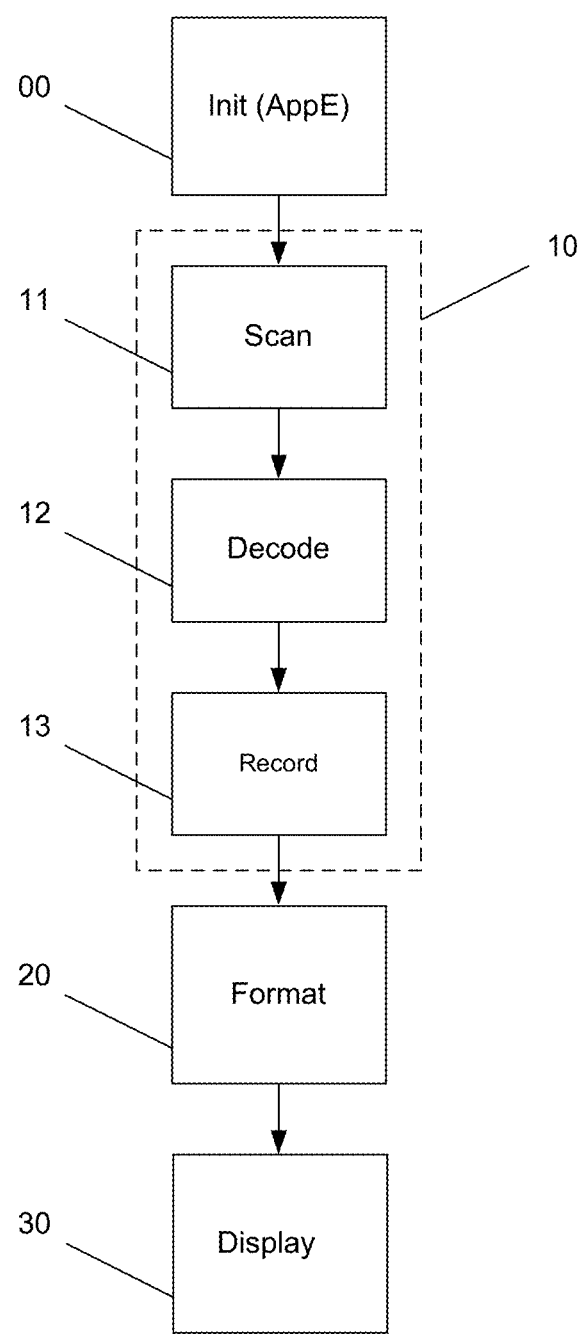
Figure 3:
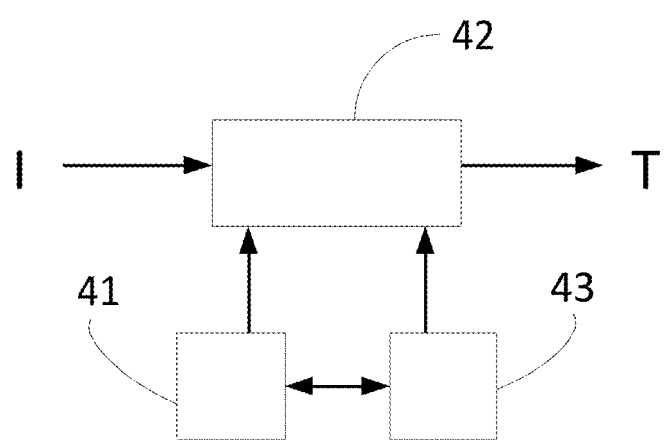

Other features and advantages of the proposed technique shall appear more clearly from the following description of a preferred embodiment, given by way of a simple illustratory and non-exhaustive example and from the appended drawings, of which:

FIG. 1 presents a block diagram of the proposed technique;

FIG. 2 provides a more precise description of the steps for obtaining the piece of consolidated data;

FIG. 3 describes a device for implementing the proposed technique.

DESCRIPTION

Reminder of the General Principle of the Invention

Since the goal is to provide the payment terminal with cashing (payment collection) functions, the principle of the invention consists in developing a unique application for collecting payment or cashing invoices. This unique application dedicated to cashing includes simple functions of cashing systems: the possibility of sharing or distributing the payment of an invoice (when the invoice is shared among several customers for example), the possibility of removing articles or applying reductions to the invoice, etc. This cashing application is called generic because it firstly does not comprise complex cashing functions (related to local, regional or national regulations) and secondly it is available for all terminals of a given type. In one particular mode of implementation, the payment terminal manufacturer can select the types or ranges of payment terminals in which the generic payment application is installed. For manufacturers of payment terminals that integrate processors showing little or no variation, the application can easily be deployed on numerous ranges or numerous types of payment terminals. The cashing application can be implemented in the form of a software or hardware module in charge of the cashing functions within the payment terminal.

The general principle of the invention also consists in implementing a generic interfacing between the payment terminal and the cashing system to avoid having to develop special interfaces which are often complex and costly. Indeed, to be able to resolve the above-mentioned problems, it is also necessary to plan for a possibility of transmitting data between the cashing system and the payment terminal.

Traditionally, such data transmission can be implemented by a physical interfacing based either on a wire transmission or a wireless transmission. The payment terminal receives data, mainly a piece of data on the amount of the transaction, and displays this piece of data in order to enable the client (the person who is paying the amount of the transaction) to pay (i.e. generally to enter a personal identification code or PIN code).

The proposed technique does not fundamentally change this way of operating. The proposed technique however modifies firstly the way in which the pieces of data are transmitted and secondly the addressee of the transmitted data.

As for the way in which the pieces of data are transmitted, the invention uses a technique that does not require any changes, whether in the payment terminal or in the cashing system. To this end, the invention makes profitable use of the capacity of the cashing system to print out a sales receipt.

Indeed, the cashing systems can be parameterized. They can be parameterized in terms of electronic display (for example for the appearance of icons or logos which are displayed on different screens of the system) as well as in terms of physical display: the logos and the data which are printed on cash receipts can be parameterized. The system offers possibilities of parameterizing for cash receipts. The proposed technique is based on these possibilities for printing not only the data usually printed (store, date, time, logo, identification of products, quantities, price per article, total price, amounts of taxes) but also a piece of data that is consolidated and converted into a visual system. This piece of consolidated data comprises, in condensed and standardized form, the totality of the payload data of the cash register receipt (date/time/identification of products, quantity per product, price per product, total amount, amounts of taxes). This piece of consolidated data is printed on the cash receipt and is readable by the payment terminal. Thus, the transmission of the payload data for the cashing functions of the payment terminal does not require the development of a complex application on the payment terminal and on the cashing system. A parameter-setting operation adapted to the cashing system can be enough. In certain situations, in which such printing is not possible, it is necessary to develop only a specific application for the cashing system and not for the terminal, which is appreciably less costly.

As for the intended recipient of the data transmitted by the cashing system, the pieces of data are always defined at the payment terminal but the pieces of data are no longer transmitted, as was conventionally the case, to a payment application (i.e. a secured application responsible for validating payment) but to the (generic) cashing application of the payment terminal which is in charge of processing transactional data. It is the cashing application that then communicates with the payment application to carry out the transaction or transactions (for example several distinct transactions when the amount of the invoice has to be divided among several payers).

More specifically, with reference to FIG. 1, the proposed technique comprises, for the payment terminal:
- a step of capturing at least one piece of data $DR_{AGR}$ from a pre-existing carrier 10, this piece of data $DR_{AGR}$ representing an invoice FR to be settled, called a piece of consolidated data;
- a step 20 for formatting the piece of consolidated data by a cashing application of said payment terminal delivering a digital invoice (FactN);
- a step 30 of display, by said cashing application, of said digital invoice (FactN);
- at least one step 40 for the transmission, to a payment application AppP of said payment terminal, of at least one piece of data representing a sum S to be paid as a function of said element E of said digital invoice.

In one particular embodiment of the invention, the step of capture comprises a step for obtaining an image representing an invoice to be settled, by means for example of a digital sensor installed on said terminal. In this case, the image is the piece of consolidated data. The formatting of the piece of consolidated data then comprises a step of optical character recognition delivering the data of the invoice. In other embodiments, the pre-existing carrier does not take the form of an invoice but for example a screen such as the screen of the cash register on which the piece of consolidated data is displayed. In another embodiment, the piece of consolidated data takes the form of an audio signal sent out by the cashing system.

Here below, we present one embodiment of the invention. This embodiment is based on one particular form of expression given to the piece of consolidated data. It goes without saying that any other textual or graphic expression of the piece of consolidated data can be preferred to the present technique without its being considered as excluded from the field of the present technique.

Description of One Embodiment

In this embodiment, we describe an implementation of the technique described by means of a two-dimensional code. In this embodiment, a QR code version 4 or 10 is used to record the consolidated data (the data containing the payload data of the cash register receipt). Other types of QR codes can also be used. This is a simple presentation. The advantage of this type of QR code is that it can store 67 (version 4) to 395 (version 10) alphanumerical characters (an equivalent in bits can also be computed).

Depending on the embodiments, a code version 40 can also be used. The goal in this embodiment is not to store a link in the two-dimensional code, namely a link (or an address) towards which the cashing application of the payment terminal will be redirected to obtain the payload data. The goal is actually to store payload data in the code. Naturally, since the storage capacity of such a code is limited, just as the capacity of the cashing system to generate such codes is limited, there is an additional problem to be resolved, namely knowing what to do when the quantity of data exceeds that of the code.

To this end, this embodiment of the invention uses two complementary solutions: the first solution consists in compressing the data that has to be inserted into the code. In this particular embodiment, this compression is done either with a Baudot encoding or with an adaptive Huffman encoding. The advantage of the use of the Baudot encoding is that the pieces of payload data are always distributed in the same sequence comprising the article (comprising letters), a quantity if any and a price (comprising digits). Now, the Baudot encoding which comprises five-bit characters is worthwhile in this situation because the succession of payload data can be predicted. Thus, the storage capacity of the code is greatly increased.

The second solution consists in printing as many codes as necessary. For example, while the capacity of the first code is exceeded, a second code is printed in order to provide missing data. The printing of the code continues so long as pieces of data have to be added.

Be that as it may, in this embodiment, at least one code comprising payload data is printed on the sales receipt. The processing operations performed by the cashing system stop at this point.

For the payment terminal as explained in FIG. 2, the proposed technique comprises:
- a step (00) for initializing a cashing application;
- a step (10) for obtaining the piece of consolidated data: in this embodiment, the step of obtaining this piece of consolidated data is done in the following steps:
  - the scanning (11) of the sales receipt by the payment terminal (the use of the scanning function is permitted for the cashing application) with the assistance of a barcode reader;
  - decoding (12) of the code obtained, comprising optionally a step of data decompression if necessary;
  - recording (13) the consolidated data within said terminal;
- a step (20) for formatting the consolidated data by means of said cashing application, delivering a digital sales receipt;
- a step (30) for displaying the digital sales receipt on the screen of said payment terminal.

Thus, the sales receipt is imported into the payment terminal. The cashing functions of the generic application can be implemented. These functions can for example be functions of division, sharing, reducing amounts, loyalty operations (loyalty credit cards), etc. In this embodiment, these functions are simple and do not interfere with the complex functions of the cashing system (such as for example calculating the amount of VAT, daily recording of transactions, etc.).

The implementation of the payment is controlled from the cashing application of the payment terminal. To this end, when payment has to be made, the cashing application sends the payment application the data needed for payment (i.e. at least the amount) and the payment application performs the operations needed for payment (verification of the PIN, obtaining banking authorization, etc.) including the printing of an expenses receipt for each meal. If the consumer decides to pay in cash or through other means of payment (restaurant vouchers for example), the application offers the possibility of noting this fact in order to compute the remainder to be paid.

In one complementary embodiment, when the functions offered by the cashing application are more complex, the proposed technique furthermore comprises a complementary step for the payment terminal which is a step for the printing, by means of a printer of the payment terminal, of a recapitulative piece of data, also aggregated, in the form of a 2D code (QR code) on the payment receipt. The payment receipt is the duplicate of the receipt which is kept by the merchant. The code which is printed thereon complementarily can be read by the cashing system, for example by means of a mobile barcode scanner, in order to take account of the complex cashing operation performed from the payment terminal.

This step for printing the two-dimensional code is preceded by a step for computing the necessary data.

In one complementary embodiment, in addition to being compressed, the pieces of data of the two-dimensional code are also encrypted. More particularly, the pieces of data are encrypted by means of a public key available through the cashing system. The cashing system encrypts the data once it is compressed (if compression is implemented).

Cashing System

As explained here above, the proposed technique is based on the capacity of the cashing system to render (or print) a piece of consolidated data, which includes the totality of the payload data, to the cashing module of the payment terminal. These pieces of payload data include at least the identification of the articles. Complementarily, these pieces of payload data also include the number of articles, the amount of these articles and the amounts of tax if any, or even the tax codes.

The cashing system, depending on the modes, can take the form of a cash register called a "smart" register which can be parameterized to carry out the printing of invoices compliant firstly with the local or regional regulations and secondly with the merchant's requirements of presentation. The cashing system can also take the form of a computer system, decentralized to a variable extent, in which enslaved cash registers are connected to a payment collection server or cashing server through a communications network. This case can for example be applied to distribution networks (franchised) or to stores and large-sized stores or businesses in which the cash registers are networked. In this case, the parameterizing can be done by all the cash registers or at the cashing server.

The system is therefore parameterized to render the consolidated piece of data, or an encoded and/or encrypted form of the consolidated data (or an encoded and/or encrypted form of the consolidated data) on the invoice during its printing or on any other suitable carrier: for example, a barcode can be printed at the merchant's request when the customer says that he would like to settle his invoice. In this case, the consolidated data is printed separately from the invoice itself. Naturally, depending on the businesses and embodiments, the invoice can also be a sales receipt, a card or any other suitable medium.

Description of a Case of Use

Here below, we present a case of use of the proposed technique in a restaurant or bar making it possible to separate the amounts on bills according to the number of persons and what each of them has consumed. In this market, the management of the bill is relatively complicated because several types of payment means have to be handled (coins, bank notes, credit cards, restaurant vouchers, assets, etc.) and this is done under special conditions (standing at the consumer's table) and finally in a context of limited time since very often this happens during peak hours.

When a table asks for the total bill to be separated, the situation becomes complicated especially when the consumers wish to pay only what each of them has consumed (rather than having the total divided by the number of consumers). The impact studied is of several kinds:
- lengthy computing time obliging the waiter to remain at the table for a long time in order to take payment;
- waiting time for other tables wishing to make orders or pay their bills;
- computation errors giving rise, at the end of the day, to a cash register error which has to be handled through numerous recounting operations.

On the contrary, through the transactional data processing method of the present technique, the cashing is done directly at the table:
1. Once the bill is requested by the consumer, the waiter types the table number into the cashing system. The cashing system prints the bill with the detail of the amount and the total;
2. On the same bill, a QR code is printed. If the pieces of information to be added on are too many, then several QR codes (representing the total bill) can be printed;

3. The printed QR code contains information on the total amount in the form of "name of dish", "quantity", "price", "VAT", each piece of data being separated by a separation symbol;
4. Once the bill has been put on the table and the consumer has requested separate payment, the waiter comes to the table to obtain payment with his electronic payment terminal;
5. Using the barcode reader of his electronic payment terminal, the waiter scans the QR code or codes. The terminal then recreates the entire bill with the data included in the QR code;
6. An interface is then used to separate the bill: the waiter asks the person P1 what he or she has consumed and ticks off the items consumed. Once the selection has been made, then the button "sub-total and payment" can be selected to proceed with the payment (whatever the type of payment);
7. Then the waiter can ask the person P2 what he has consumed and so on and so forth. The total "remainder to be paid" is automatically updated at the end of each sub-total paid;
8. At the end of payment, the sub-total therefore has to be at zero to validate the fact that all the consumers of a table have truly paid for what they consumed.

Then, at the consumer's request, an expenses receipt can be printed out at the end of each sub-total paid or each sub-total payment.

Thus, the payment terminal equipped with a generic cashing application as understood in this technique associated with a simplified obtaining of payload data relative to the purchase enables the merchant to have available a payment terminal that is useful in the case of cash processing localized at places different from the place in which the main cashing system of the business is situated.

Other Features and Advantages

Referring to FIG. 3, we present a simplified architecture of a payment terminal capable of implementing the described technique. Such a terminal comprises a memory 41, a processing unit 42 equipped for example with a microprocessor and driven by the computer program 43 implementing at least one part of the method as described. In one embodiment, the technique described is implemented in the form of a software application. In another embodiment, the described technique is implemented in purely hardware form by means of processors and interfaces specially created for this purpose, for example a secured payment terminal. Such a payment terminal comprises:
  means for capturing at least one piece of data representing an invoice to be settled, called a piece of consolidated data;
  means for formatting the piece of consolidated data by a cashing application of said payment terminal delivering a digital invoice;
  means of display, by said cashing application, of said digital invoice;
  means of transmission, to an application of said payment terminal, of at least one piece of data representing a sum to be paid as a function of at least one element of said digital invoice, called a transactional piece of data.

These means are driven by the microprocessor by means of the program loaded into the memory of the terminal. Depending on the embodiments, the terminal also comprises other means such as means of transmission/reception of data, enabling exchanges with a cashing system such as means for printing two-dimensional codes comprising data reporting on transactions made by means of said terminal. The terminal can also comprise cryptographic processing modules for the encryption and decryption of the data.

Such modules and components constitute the means implemented to carry out operations needed with reference to the present technique. Such means can take hardware form, for example as processors or microprocessors of the FPGA type or again software form, or a combination of these forms.

The invention claimed is:
1. A method for processing transactional data by a payment terminal of a merchant, said method for processing being executed by a cashing application embedded in said payment terminal and comprising:
  capturing by a sensor of the payment terminal of the merchant, at least one piece of data representing an invoice to be settled, called a piece of consolidated data, from the invoice, which is:
    printed on a pre-existing carrier by a cashing system, or
    rendered on a display by the cashing system;
  delivering a digital invoice by formatting the piece of consolidated data, captured from the invoice printed or rendered by the cashing system;
  displaying said digital invoice;
  performing a cashing operation, comprising:
    transmitting to a payment application embedded in said payment terminal, at least one piece of data representing a sum to be paid as a function of at least one element of said digital invoice, called a piece of transactional data; and
    performing a payment transaction by the payment application based on the at least one piece of data representing the sum to be paid.

2. The method for processing according to claim 1, wherein capturing said piece of consolidated data comprises:
  obtaining a two-dimensional code preliminarily printed or rendered by the cashing system; and
  decoding said two-dimensional code delivering said piece of consolidated data.

3. The method for processing according to claim 2, wherein capturing said piece of consolidated data furthermore comprises, subsequently to said decoding said two-dimensional code, decompressing the data of said two-dimensional code.

4. The method for processing according to claim 2, wherein capturing said piece of consolidated data furthermore comprises, subsequently to said decoding said two-dimensional code, decrypting the data of said two-dimensional code.

5. The method for processing according to claim 1, wherein the method further comprises, subsequently to the transmission of said at least one piece of data representing a sum to be paid, to said payment application of said payment terminal:
  taking control of said payment terminal by said payment application;
  implementing the payment transaction by said payment application;
  supplying a result of said payment transaction to said cashing application;
  integrating said result of said payment transaction, by said cashing application.

6. A payment terminal of a merchant for processing the transactional data, comprising:

a sensor;

at least one hardware processor; and a non-transitory computer-readable medium comprising instructions stored thereon, including a cashing application embedded in said payment terminal of the merchant, which when executed by the at least one hardware processor configure the at least one hardware processor to perform acts comprising:

capturing by the sensor at least one piece of data representing an invoice to be settled, called a piece of consolidated data, from the invoice, which is:
printed on a pre-existing carrier by a cashing system, or rendered on a display by the cashing system;

delivering a digital invoice by formatting the piece of consolidated data, captured from the invoice printed or rendered by the cashing system;

displaying said digital invoice by said cashing application;

performing a cashing operation, comprising:
transmitting at least one piece of data representing a sum to be paid as a function of at least one element of said digital invoice, called a piece of transactional data, to a payment application embedded in said payment terminal; and performing a payment transaction by the payment application based on the at least one piece of data representing the sum to be paid.

7. A non-transitory computer-readable medium comprising a computer program product stored thereon, which comprises program code instructions of a payment application embedded in a payment terminal of a merchant to execute a method of processing transactional data by the payment terminal, when the instructions are executed on a computer of the payment terminal, wherein the instructions comprise:

instructions that configure the payment terminal of the merchant to capture, by a sensor of the payment terminal, at least one piece of data representing an invoice to be settled, called a piece of consolidated data, from the invoice, which is:
printed on a pre-existing carrier by a cashing system, or rendered on a display by the cashing system;

instructions that configure the payment terminal to deliver a digital invoice by formatting the piece of consolidated data, captured from the invoice printed or rendered by the cashing system;

instructions that configure the payment terminal to display said digital invoice;

instructions that configure the payment terminal to perform a cashing operation, comprising:
transmitting to a payment application embedded in said payment terminal, at least one piece of data representing a sum to be paid as a function of at least one element of said digital invoice, called a piece of transactional data; and performing a payment transaction by the payment application based on the at least one piece of data representing the sum to be paid.

8. The method for processing according to claim 1, wherein performing a cashing operation comprises:
for a first customer, selecting at least one first item on the digital invoice and performing the acts of transmitting and performing a payment transaction on the at least one first item for the first customer; and for at least one second customer, selecting at least one second item on the digital invoice and performing the acts of transmitting and performing a payment transaction on the at least one second item for the second customer.

* * * * *

UNITED STATES PATENT AND TRADEMARK OFFICE
CERTIFICATE OF CORRECTION

PATENT NO. : 10,504,078 B2  
APPLICATION NO. : 15/024271  
DATED : December 10, 2019  
INVENTOR(S) : Vincent Ducrohet Page 1 of 1

It is certified that error appears in the above-identified patent and that said Letters Patent is hereby corrected as shown below:

In the Claims

In Claim 6, Column 11, Lines 17-18:
Please delete "displaying said digital invoice by said cashing application;" and insert --displaying said digital invoice;--

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*